US008964637B2

(12) United States Patent
Parolari

(10) Patent No.: US 8,964,637 B2
(45) Date of Patent: Feb. 24, 2015

(54) ENABLING LOCAL SWITCHING IN MOBILE RADIO NETWORKS

(75) Inventor: Sergio Parolari, Milan (IT)

(73) Assignee: Nokia Solutions and Networks Oy, Espoo (FI)

( * ) Notice: Subject to any disclaimer, the term of this patent is extended or adjusted under 35 U.S.C. 154(b) by 204 days.

(21) Appl. No.: 12/734,512

(22) PCT Filed: Nov. 6, 2008

(86) PCT No.: PCT/EP2008/065093
§ 371 (c)(1),
(2), (4) Date: Nov. 9, 2010

(87) PCT Pub. No.: WO2009/060046
PCT Pub. Date: May 14, 2009

(65) Prior Publication Data
US 2011/0110295 A1    May 12, 2011

(30) Foreign Application Priority Data

Nov. 6, 2007   (EP) ................................. 07425695
Sep. 9, 2008   (EP) ................................. 08105276

(51) Int. Cl.
*H04W 40/00*   (2009.01)
*H04W 8/08*    (2009.01)
*H04W 92/14*   (2009.01)

(52) U.S. Cl.
CPC ............ *H04W 8/082* (2013.01); *H04W 92/14* (2013.01)
USPC ........................ 370/328; 370/353; 370/329

(58) Field of Classification Search
USPC ......................... 370/328, 353, 329
See application file for complete search history.

(56) References Cited

U.S. PATENT DOCUMENTS

2007/0058609 A1*   3/2007   Goel et al. ................. 370/352
2007/0232338 A1   10/2007   Niska et al.
2008/0310404 A1*  12/2008   Valme et al. ............... 370/353

FOREIGN PATENT DOCUMENTS

| CN | 1954551 | 4/2007 |
| EP | 1343346 | 9/2003 |
| EP | 1523135 | 4/2005 |
| JP | 2003-259422 | 9/2003 |
| JP | 2003-338832 | 11/2003 |
| WO | 95/24789 | 9/1995 |
| WO | 01/56315 A1 | 8/2001 |

(Continued)

OTHER PUBLICATIONS

"3rd Generation Partnership Project; Technical Specification Group GSM/EDGE Radio Access Network; Mobile Switching Centre—Base Station System (MSC-BSS) Interface; Layer 3 specification (Release 8)", 3GPP TS 48.008 V8.0.0, Sep. 2007, pp. 1-186.

(Continued)

*Primary Examiner* — Dang Ton
*Assistant Examiner* — Pamit Kaur

(57) ABSTRACT

When a new connection needs to be established in a mobile radio network between the core network and the radio access network to terminate a local circuit switched (CS) call, i.e. a CS call for which another connection has already been established between the core network and the same radio access network, the core network includes an optional information element containing "Other party information" in the messages that establish the new connection, allowing the radio access network to correlate the two connections, put them in direct communication and exclude the core network from the user plane data flow.

20 Claims, 2 Drawing Sheets

(56) References Cited

FOREIGN PATENT DOCUMENTS

| WO | WO01/56315 | * | 8/2001 |
|---|---|---|---|
| WO | 2004/002177 A1 | | 12/2003 |
| WO | 2005/114911 | | 12/2005 |

OTHER PUBLICATIONS

Telefon AB LM Ericsson, "AoIP Motivation, Architecture, Functional Impacts", G2-070359, 3GPP TSG GERAN2 Meeting #35bis, Oct. 2007, pp. 1-7.

"3rd Generation Partnership Project; Technical Specification Group GERAN; A-interface over IP Study; (Release 8)", 3GPP TR ab.cde V0.0.1, Sep. 2007, pp. 1-9.

International Search Report for Application No. PCT/EP2008/065093; mailed Feb. 16, 2009.

Office Action and Search Report in corresponding Chinese Patent Application No. 200880124037.8, issued Sep. 29, 2012.

Decision of Grant in corresponding Japanese Patent Application No. 2010-532594 mailed Nov. 15, 2012.

* cited by examiner

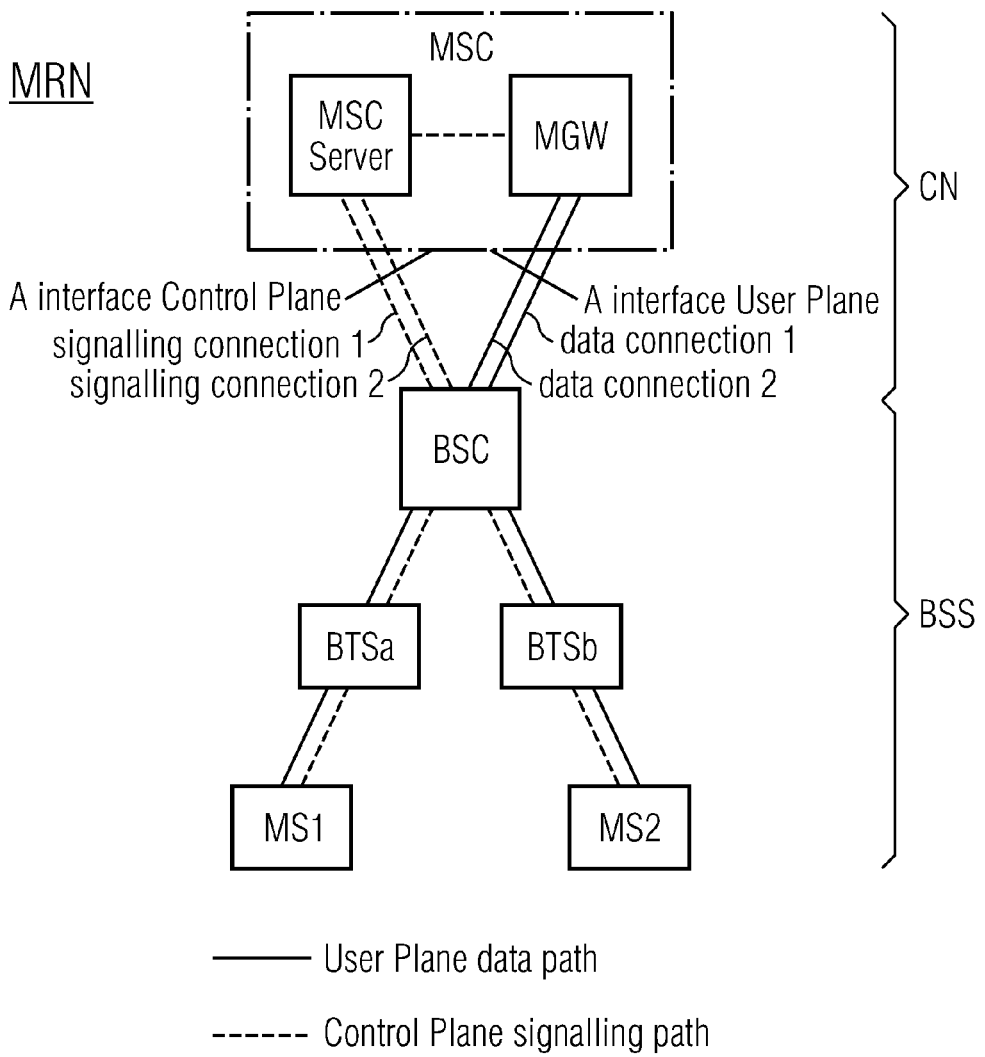

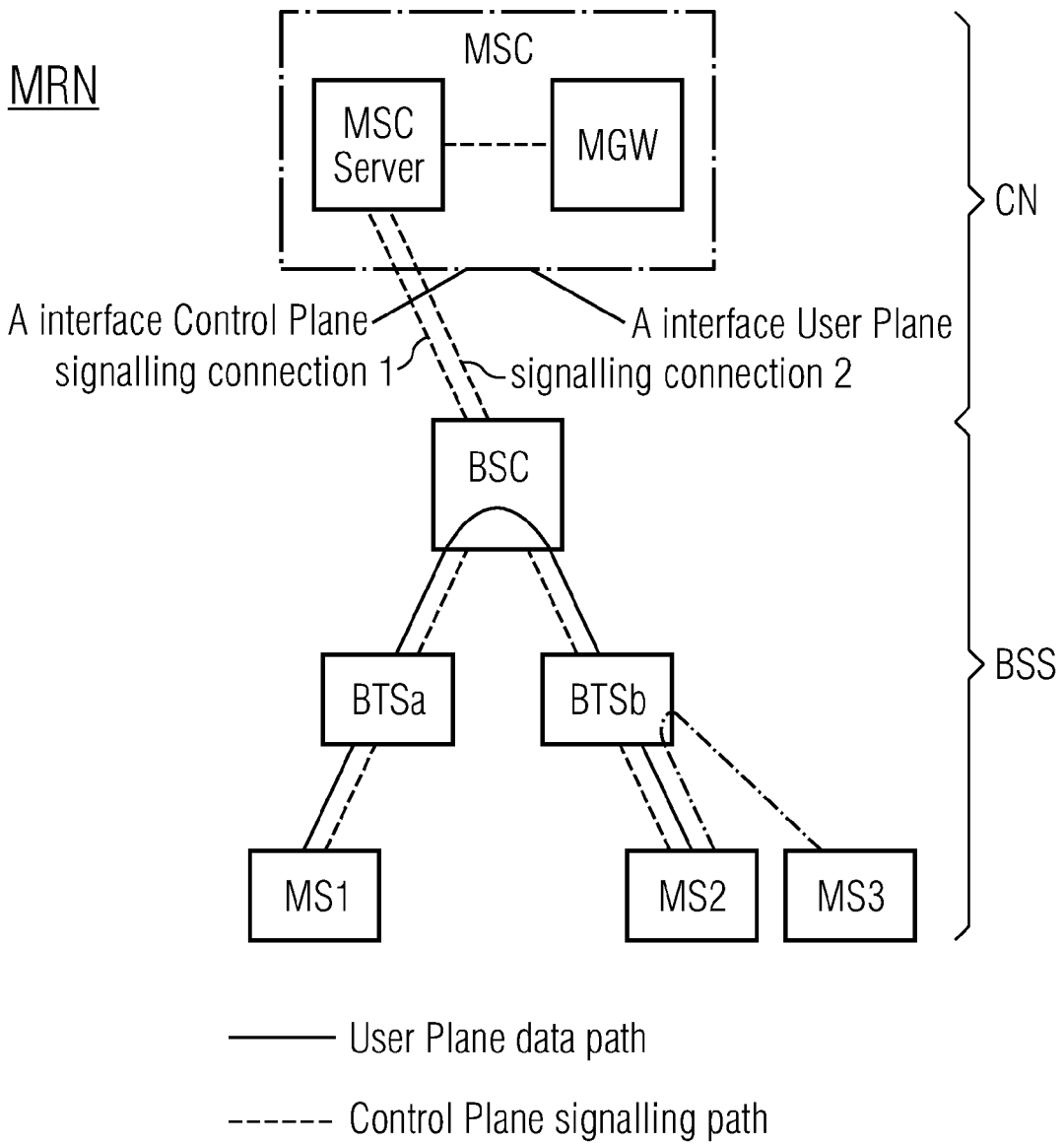

ENABLING LOCAL SWITCHING IN MOBILE RADIO NETWORKS

CROSS REFERENCE TO RELATED APPLICATIONS

This application is the U.S. national stage of International Application No. PCT/EP2008/065093, filed Nov. 6, 2008 and claims the benefit thereof. The International Application claims the benefits of European Application No. 07425695 filed on Nov. 6, 2007 and European Application No. 08105276, filed on Sep. 9, 2008 all applications are incorporated by reference herein in their entirety.

BACKGROUND

Described below is a method and to a system for enabling local switching in mobile radio networks and, more particularly, for enabling local switching of circuit switched (CS) calls in mobile radio networks, in particular GERAN networks.

A GERAN network includes an access network, made of several Base Station Subsystems (BSS), and a core network, made of—in the CS domain—several Mobile Switching Centers (MSC). A BSS includes a Base Station Controller (BSC) connected to several Base Transceiver Stations (BTS). A MSC can optionally be split in a MSC Server (MSC-S), dealing with the Control Plane procedures, and a Media Gateway (MGW), dealing with User Plane data. One BSC is typically connected to a MSC via the A interface, but possibly also to more than one, e.g. for redundancy reasons. One MSC is typically connected to more than one BSC. The A interface is the interface that connects the BSS and the MSC (as described in 3GPP TS 48.008, "Mobile Switching Centre-Base Station System (MSC-BSS) interface").

In a mobile radio network like GERAN every CS call needs to go through a MSC, including both the signalling and the user plane data flow. This applies also in case the user originating the call and the user terminating the call are connected to BTS's controlled by the same BSC, i.e. also for local calls inside one BSS. This is needed because when a mobile station originates the call, the BSC has no information about the identity of the called party, and whether it is located in the same BSS area or not. The call is always controlled by the MSC that also establishes a circuit (identified by a Circuit Identity Code—CIC) towards the BSS where the call is originated and another circuit (with another CIC) towards the BSS where the call is terminated. In case the calling and the called parties belong to the same BSS, two circuits are established between the BSS and the MSC.

The term local switching refers to the possibility to exclude the MSC from the user plane data flow (or exclude the MGW, when the MSC functionalities are split into a MSC-S and a MGW) whenever a CS call involves two mobile stations served by the same BSS, and rely on the BSC for switching the CS call through to the target cell. One of the important benefits of this is that establishing two circuits on the user plane interface between the BSC and the MSC (or the between the BSC and the MGW) could be avoided and a lot of bandwidth could be saved.

As already described, local switching is currently not possible because, even after the call is established by the MSC, the BSC has no information to correlate "who is talking to whom". And even if the BSC had the information, the circuits towards the MSC (or MGW) would already be established and could not be released.

A feasibility study is currently ongoing in the 3GPP TSG GERAN committee to define an IP-based A interface in the user plane (see G2-070305, "AoIP Motivation, Architecture, Functional Impacts", GERAN WG2#35bis and G2-070359, "Draft Techinal Report: A-interface over IP", GERAN WG2#35bis).

The main idea of such proposal is to replace the user plane circuits between the MSC (or MGW) and the BSC with IP connections (i.e. with a pair of IP addresses and UDP ports) and consequently replace the CICs with identifiers of the IP connection (e.g. with "A over IP Call Instance Codes") or, equivalently, with identifiers of the signalling connection associated to the it (e.g. with "A over IP Signalling Connection Identifiers").

The standardization of the A interface over IP (in the User Plane) has many goals, for instance an easier network configuration, and the possibility to use compressed speech codecs between the BSS and the MSC, so that the need of bandwidth on the A interface is reduced.

However, for local CS calls (i.e. calls involving two mobile stations controlled by the same BSC) it is still needed to consume some bandwidth on the A interface. Only with a local switching approach it is possible to bring the bandwidth needed on the A interface down to zero.

Moreover, if local switching is enabled also the end to end delay can be reduced because the transmission path is shortened (it is not necessary to go back and forth to the MSC (MGW)).

SUMMARY

It is therefore an aim of the method described below to obtain further bandwidth savings and delay reductions by allowing local switching of circuit switched (CS) calls in mobile radio networks.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 1 is a block diagram which schematically illustrates an example of Local Call with switching in the MSC (MGW);

FIG. 2 is a block diagram which schematically illustrates an example Local Call with local switching in the BSC.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

According to embodiments, it is added an optional information element containing "Other party information" to the messages that establish a new IP connection between the MSC (MGW) and the BSC.

The "Other party information" element is considered as optional due to fact it may be inserted for local calls only.

The messages where the optional field needs to be added are at least the ASSIGNMENT REQUEST (for call setup) and the HANDOVER REQUEST messages (for incoming inter-BSS handovers).

The "Other party information" information element is included by the MSC (or MSC-S) in the messages that establish a new IP connection with a given BSS when it knows that such IP connection is meant to terminate a local CS call, i.e. a CS call for which another IP connection has already been established by the MSC (or MSC-S) towards the same BSS.

The MSC may avoid including the "Other party information", e.g. when the CS call needs anyway to go through the core network to allow Lawful Interception.

The "Other party information" may include the following information:
- the "A over IP Call Instance Codes" (or, equivalently, "A over IP Signalling Connection Identifiers") of the IP connection of the "other party" and/or
- the IP address and UDP port at the MSC (MGW) of the IP connection of the "other party" and/or
- the IP address and UDP port at the BSC of the IP connection of the "other party".

When the messages establishing the new IP connection are then acknowledged by the BSS, the BSS is able to correlate the two IP connections and then optionally decide to put them in direct communication to perform local switching, i.e. exclude the MSC (or MGW) from the user plane data flow. The two IP connections towards the MSC don't have to be released. Simply the MSC (or MGW) shall not expect to receive data through them.

The user plane data flow towards the MSC (or MGW) is restarted by the BSC when one of the involved IP connections is released by the MSC, e.g. when an outgoing inter-BSS handover is performed for a mobile station moving out of the BSS area.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

LISTS OF ACRONYMS

BSS Base Station Subsystem
BSC Base Station Controller
BTS Base Transceiver Station
CIC Circuit Identity Code
CS Circuit Switched
IP Internet Protocol
MS Mobile Station
MSC Mobile Switching Centre
MSC-S MSC Server
MGW Media GateWay
UDP User Datagram Protocol

The invention claimed is:

1. A method for local switching of circuit switched calls in mobile radio networks, comprising:
   receiving, by a base station controller or a base station system from a switching center, a connection message, the connection message including other party information in an optional information element, the other party information including a connection identifier; and
   in response to detection of the other party information including the connection identifier:
      establishing a new connection between a core network and a radio access network;
      terminating a local circuit switched call, for which another connection has already been established between the core network and the radio access network, to enable direct communication that excludes the core network from user plane data flow; and
      correlating the new connection and the other connection, for which the another connection has already been established with the core network, by the radio access network based on the other party information.

2. The method according to claim 1, wherein the mobile radio network is a Global System for Mobile Communications/Edge Radio Access Network.

3. The method according to claim 2, wherein the connections between the core network and the radio access network are Internet protocol connections.

4. The method according to claim 3, wherein the connection identifier includes an identifier of a signaling connection associated to a user plane connection.

5. The method according to claim 4, wherein the connection identifier includes an Internet protocol address and user datagram protocol port at the core network of the Internet protocol connection of another party.

6. The method according to claim 4, wherein the connection identifier includes an Internet protocol address and user datagram protocol port at the radio access network of the Internet protocol connection of the other party.

7. The method of claim 1, wherein the connection identifier includes a port of the base station controller or the base station system.

8. The method of claim 1, wherein the connection identifier includes an address of a mobile switching center.

9. The method of claim 1, wherein the connection identifier includes a port of a mobile switching center.

10. The method of claim 1, wherein the connection identifier includes an address of the base station controller or the base station system.

11. A system for local switching of circuit switched calls in a mobile radio network communicating via a radio access network and a core network, comprising:
    means for receiving a connection message, the connection message including other party information in an optional information element, the other party information including a connection identifier; and
    means for responding to detection of the other party information including the connection identifier by:
      establishing a new connection between the core network and the radio access network,
      terminating a local circuit switched call, for which another connection has already been established between the core network and the radio access network, to enable direct communication that excludes the core network from user data plane flow, and
      correlating the new connection and the other connection, for which the another connection has already been established with the core network, by the radio access network based on the other party information.

12. The system according to claim 11, wherein the mobile radio network is a Global System for Mobile Communications/Edge Radio Access Network.

13. The system according to claim 12, wherein the connection identifier includes an identifier of a signaling connection associated to a user plane connection.

14. The system according to claim 13, wherein the connection identifier includes an Internet protocol address and user datagram protocol port at the core network of an Internet protocol connection of another party.

15. The system according to claim 13, wherein the connection identifier includes an Internet protocol address and user datagram protocol port at the radio access network of an Internet protocol connection of the other party.

16. A network node in a system for local switching of circuit switched calls in a mobile radio network communicating via a radio access network and a core network, comprising:
a core network interface for receiving other party information in an optional information element of messages from the core network, the other party information including a connection identifier; and
at least one processor programmed to respond to detection of the other party information in one of the messages from the core network based on the other party information including the connection identifier by:
establishing a new connection with the core network,
terminating a local circuit switched call, for which another connection has already been established with the core network, to enable direct communication that excludes the core network from user plane data flow; and
correlating the new connection and the other connection, for which the another connection has already been established with the core network, based on the other party information.

17. The network node of claim 16, wherein the connection identifier includes a port of a base station controller or a base station system.

18. The network node of claim 16, wherein the connection identifier includes an address of a mobile switching center.

19. The network node of claim 16, wherein the connection identifier includes a port of a mobile switching center.

20. The network node of claim 16, wherein the connection identifier includes an address of a base station controller or a base station system.

* * * * *